United States Patent [19]
Neeser

[11] Patent Number: 6,010,046
[45] Date of Patent: Jan. 4, 2000

[54] STORAGE BOX ASSEMBLY FOR PICKUP TRUCKS

[76] Inventor: Coleman J. Neeser, 22200 E. Eucliv, Ottis Orchards, Spokane, Wash. 99027

[21] Appl. No.: 09/130,327

[22] Filed: Aug. 6, 1998

[51] Int. Cl.$^7$ ....................................................... B60R 7/00
[52] U.S. Cl. .......................... 224/281; 108/447; 206/349; 224/522; 224/523; 224/524; 224/525; 224/537; 224/565; 224/566; 312/310
[58] Field of Search .................................... 224/281, 504, 224/505, 506, 522, 523, 524, 525, 537, 548, 551, 554, 565, 566, 571; 206/349; 312/310, 312; 248/157, 188.5; 108/147, 447

[56] References Cited

U.S. PATENT DOCUMENTS

| | | | |
|---|---|---|---|
| 5,088,421 | 2/1992 | Beckstead | 108/144 |
| 5,129,611 | 7/1992 | Grover et al. | 248/688 |
| 5,161,868 | 11/1992 | Hooser | 312/223.4 |
| 5,387,064 | 2/1995 | Cardinal | 410/89 |
| 5,439,150 | 8/1995 | Trahms | 224/404 |

*Primary Examiner*—Gregory M. Vidovich
*Assistant Examiner*—Maerena W. Brevard
*Attorney, Agent, or Firm*—Delbert J. Barnard

[57] ABSTRACT

A storage box assembly for a truck cargo compartment with sidewalls and a bottom. A pair of storage boxes (54, 56) are mounted on a frame (12) for lateral movement towards and away from each other (FIG. 3). Vertically adjustable columns (22) are provided at the corners of the frame (12). They are fitable within the storage compartment (FIG. 3) and are adapted for raising and lowering the frame (12) to move the frame (12) between a lowered position (FIG. 1) and a raised position (FIG. 2). When the frame (12) is in its lowered position the storage boxes (54, 56) are down within the cargo compartment. When the frame (12) is in its raised position the storage boxes (54, 56) are elevated above the bottom (32) of the cargo compartment. The storage boxes (54, 56) are adapted to moved laterally inwardly towards each other, so that when the frame (12) is in its lowered position (FIG. 1), the storage boxes (54, 56) can be placed between the sides (36, 38) of the cargo compartment. The storage boxes (54, 56) are adapted to be movable laterally away from each other so that after the frame (12) has been raised into its raised position (FIG. 3) the storage boxes (54, 56) can be moved into positions in which they are accessible from outside the cargo compartment (FIG. 3).

21 Claims, 7 Drawing Sheets

STORAGE BOX ASSEMBLY FOR PICKUP TRUCKS

TECHNICAL FIELD

The present invention relates to a storage box assembly that is adapted to be mounted into the cargo compartment of a pickup truck. More particularly, it relates to the provision of such a storage box assembly that has two storage boxes, a lowered position in which the two storage boxes are positioned relatively close together near the floor and between the two sides of the cargo compartment, and an elevated position in which the two storage boxes are raised and moved apart into positions where they are accessible from outside the cargo compartment.

BACKGROUND OF THE INVENTION

As is well known, pickup trucks have cargo compartments which are used for carrying a great variety of items. There is a need for adapting the cargo compartment of a pickup so that items can be carried in an orderly manner and in a way making them easily accessed without a need for one to climb up into the cargo compartment. When carrying tools, for example, it is desirable to organize the tools in a holding space that is easily accessible when it is needed to retrieve the tools or place them back into storage.

A principal object of the present invention is to provide storage boxes for a cargo compartment of a truck and a support system for the storage boxes which enables movement of the storage boxes from a stowed position down in the cargo compartment upwardly and outwardly to a utility position in which the tools are easily accessible from outside the storage compartment.

DISCLOSURE OF THE INVENTION

The present invention is basically characterized by a storage box assembly for truck cargo compartment with sidewalls and a bottom. The storage box assembly comprises a frame, a pair of storage boxes mounted on the frame for lateral movement towards and away from each other, and vertically adjustable columns at the corners of the frame, fitable within the cargo compartment, and provided for raising and lowering the frame to move the frame between a lowered position and a raised position. When the frame is in its lowered position the storage boxes are down within the storage compartment. When the frame is in its raised position the storage boxes are elevated above the bottom of the cargo compartment. The storage boxes are adapted to be moved laterally inwardly towards each other so that when the frame is in its lowered position, the storage boxes can be placed between the sides of the cargo compartment. The storage boxes are adapted to be movable laterally away from each other so that after the frame has been raised into its raised position, the storage boxes can be moved outwardly into positions in which they are accessible from outside the cargo compartment.

According to an aspect of the invention, the frame includes a top panel that is dimensioned to substantially cover the cargo compartment when the frame is in its lowered position. In such position, the top panel of the frame may extend laterally over the sidewalls of the truck cargo compartment.

According to another aspect of the invention, the vertically adjustable columns at the corners of the frame may be screw jacks. The assembly may include drive means for driving all four screw jacks together, for causing the four corners of the frame to go up and down together.

In preferred form, the screw jacks each have a housing with a base that is adapted for mounting the housing to the truck cargo compartment, and an upper end portion that is internally threaded. An externally threaded rod extends upwardly and outwardly from the housing. Its external threads mate with the internal threads in the upper end portion of the housing. The externally threaded rods are adapted to rotate both clockwise and counterclockwise. Rotation in one direction causes the externally threaded rods to move axially upwardly out from their housings. Rotation in the opposite direction causes the externally threaded rods to move axially downwardly into the housing. A toothed wheel may be fixed to the upper end of each externally threaded rod and a chain may extend around and engage all of the toothed wheels. Movement of the chain back and forth along its length will part a driving force to the toothed wheels for rotating them and the threaded rod portions of the screw jacks. In the preferred embodiment, the storage box assembly includes a power drive for the chain, for moving the chain back and forth along its length. The power drive may include a toothed wheel that engages the chain and a motor for selectively driving the toothed wheel in each direction of rotation.

According to another aspect of the invention, the frame includes a top panel with a four sided periphery, a vertical sidewall extending downwardly from the top panel at its periphery, and a horizontal flange projecting laterally inwardly from the vertical wall. The peripheral portion of the top panel, the vertical wall and the flange together provide stiffness and strength to the peripheral portion of the frame.

According to still another aspect of the invention, a carrier rack may be secured to the frame, into a position above the frame and above the storage boxes. The carrier rack may have an extendable portion, for increasing its length.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several figures of the drawing, and.

BEST MODE FOR CARRYING OUT THE INVENTION

Figure 1:
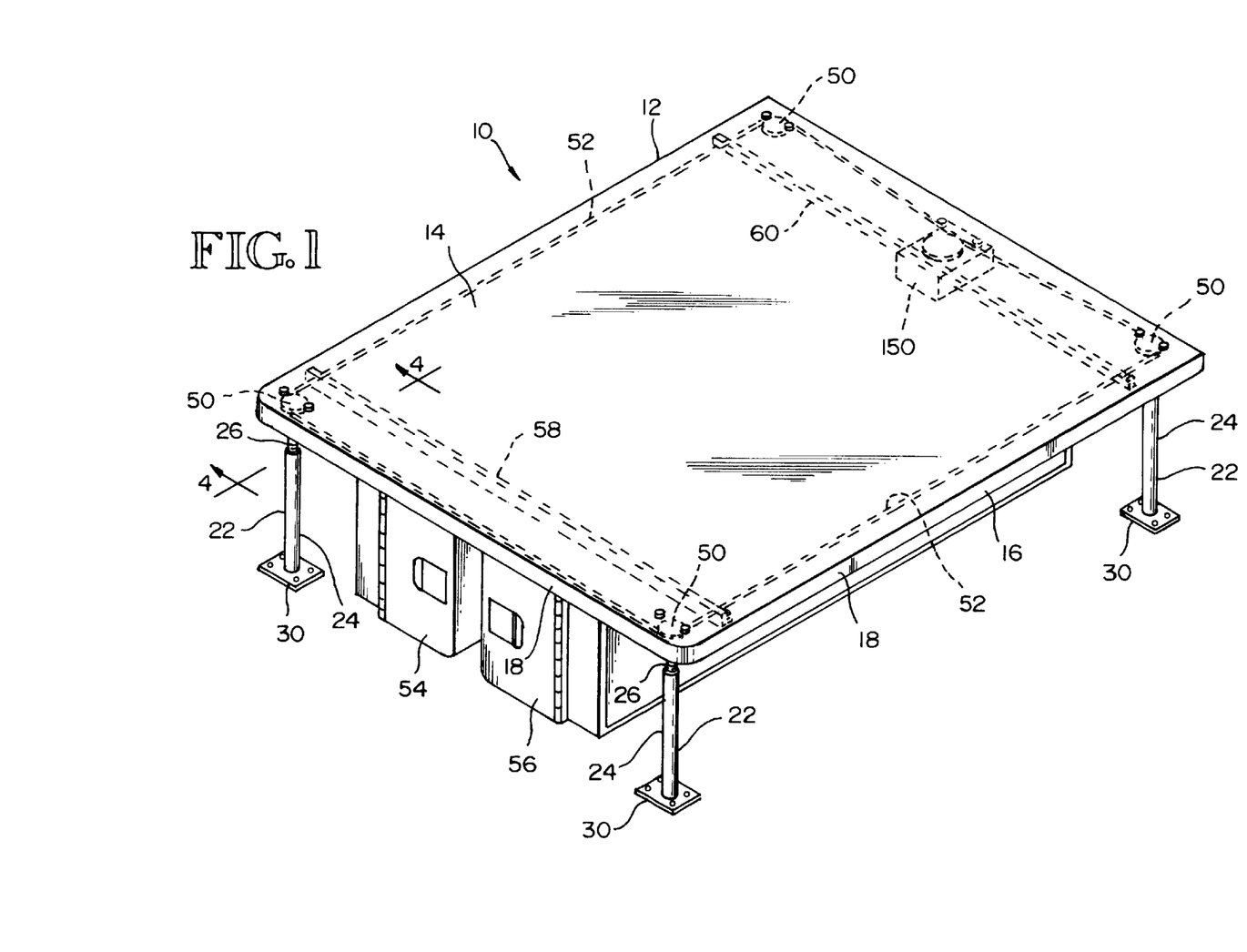
FIG. 1 is a pictorial view of a storage box assembly of the present invention, shown outside of a truck cargo compartment, such view being taken from above and looking toward one end and one side of the assembly and showing the assembly in its lowered position in which the storage boxes are moved inwardly close together.

Referring now to FIG. 1 of the drawing, the storage box assembly 10 that forms the best mode or preferred embodiment of the invention comprises a frame 12 having a top wall or panel 14 and a perimeter portion 16 that further includes a perimeter vertical wall 18 and a horizontal bottom flange 20. The walls 14, 18 and the flange 20 together provide a relatively strong and rigid perimeter structure for the frame 10.

As shown by FIGS. 1–4, a vertically adjustable column 22 is provided at each of the four corners of the frame 10. By way of typical and therefor non limitive example, the columns 22 may be screw jacks, each having a housing portion 24 and a rod or screw portion 26. The upper portion of the housing 24 may include an internally threaded portion 28 and the rod 26 may include external threads that mate with the internal threads of portion 28. The housings 24 may include base plates 30 adapted to be bolted, screwed or otherwise secured to the bottom wall or bed 32 of the cargo compartment 34. The upper portions 28 of the housings 24 may be suitably secured to upper portions of the sidewalls 36, 38 of the truck cargo compartment 34, such as at locations 40, 42 in FIG. 3.

Figure 2:
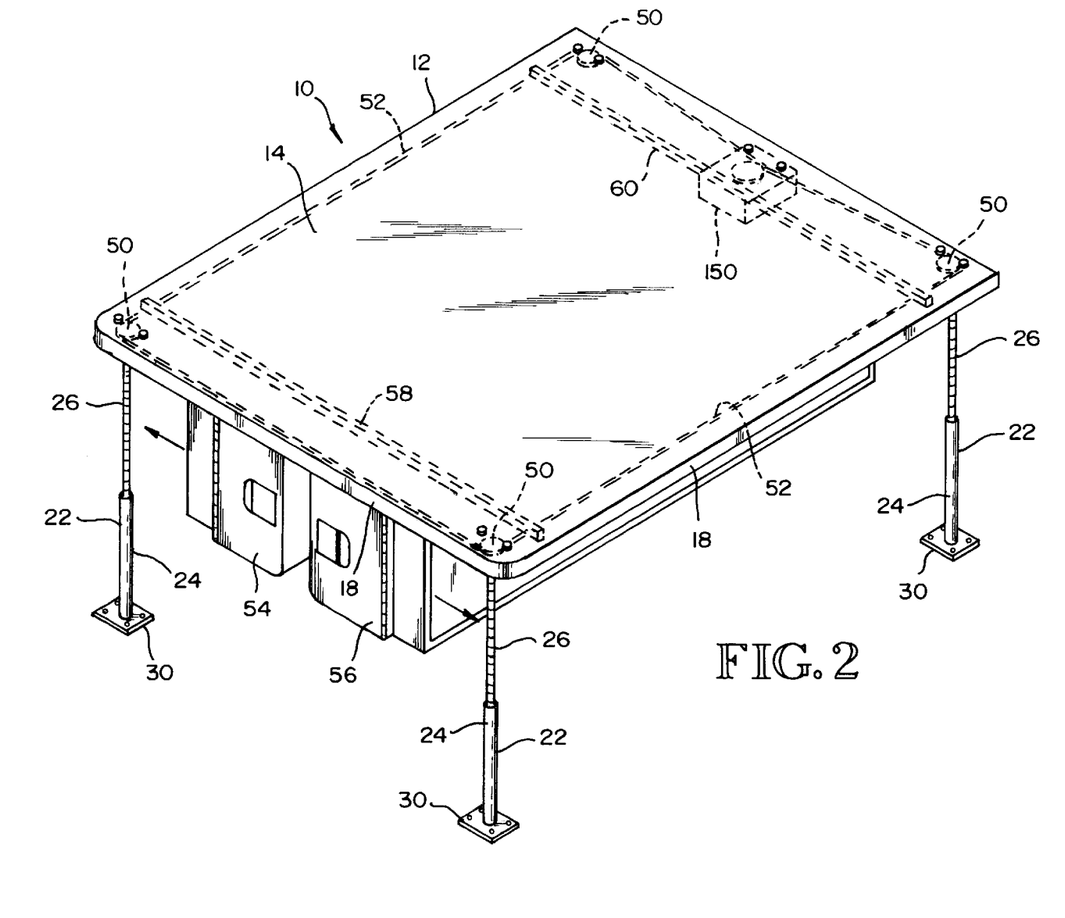
FIG. 2 is a view like FIG. 1 but showing the assembly in a raised position with the storage boxes still relatively together.
Figure 3:
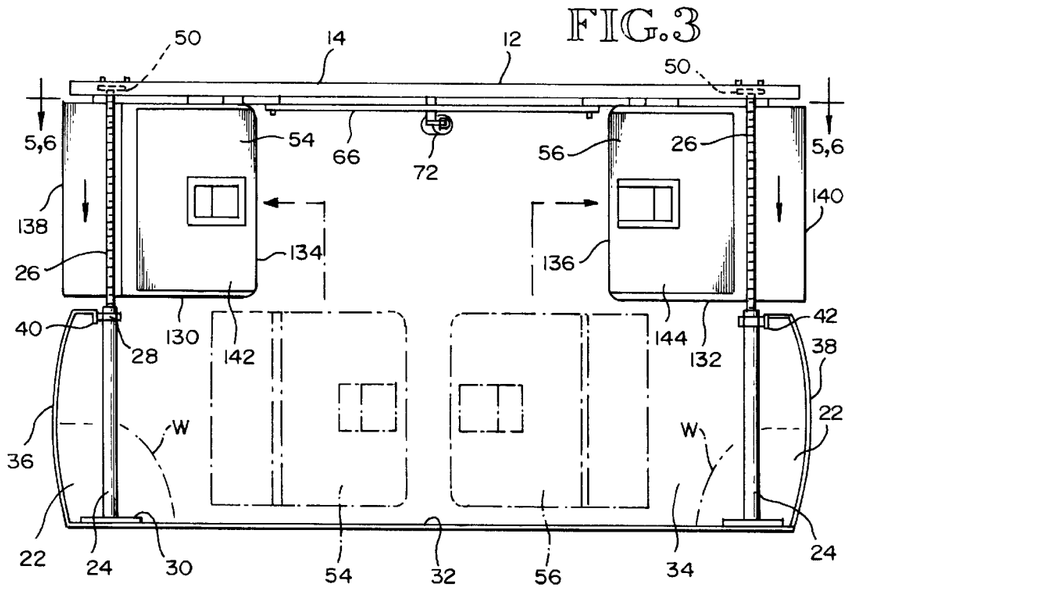
FIG. 3 is an end view of the assembly in a raised position, including a solid line showing of the storage boxes moved apart into positions in which they are accessible from the sides of the truck, and further including a broken or phantom line showing of the storage boxes positioned relatively together in a lowered position within the cargo compartment.

In a known manner, the upper ends of the threaded rods 26 may be supported for rotation by a bearing 44 that receives the upper end of the threaded rod 26 and is connected to the top wall 14 at 46. Below each bearing 44, a sleeve 48 is fixed to the upper end of each threaded rod 26 so as to rotate with it. The sleeve 48 includes a toothed wheel or sprocket 50. Each toothed wheel 50 engages a drive chain 52 that extends around the perimeter of the frame 10, such as is shown in FIGS. 1 and 2. The chain 52 extends around four toothed wheels 50 that are at the four corners of the frame 10. The chain 52 travels lengthwise back and forth both clockwise and counterclockwise. Movement of the chain 52 causes rotation of the toothed wheels 50. Rotation of the toothed wheels 50 causes a rotation of the threaded rods 26. Rotation of the threaded rods 26 in one direction causes them to screw themselves down into the housings 22. Rotation of the threaded rods 26 in the opposite direction causes them to screw themselves out from the housings 22. The chain 52 functions to synchronize movement of all four threaded rods 26 so that they move upwardly and downwardly together.

Figure 5:
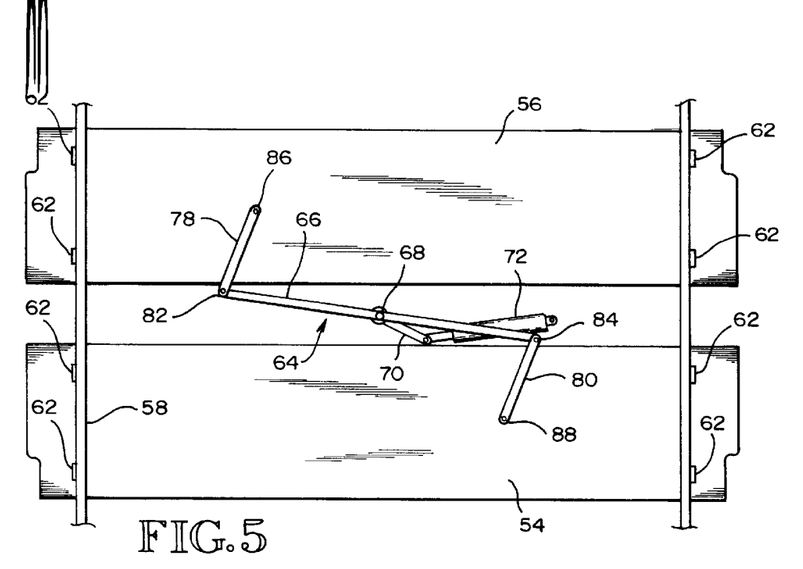
FIG. 5 is a sectional view taken substantially along line 5,6—5,6 of FIG. 3, such view showing the storage boxes positioned relatively together and further showing a mechanism for moving the storage boxes together and apart in its retracted position.
Figure 6:
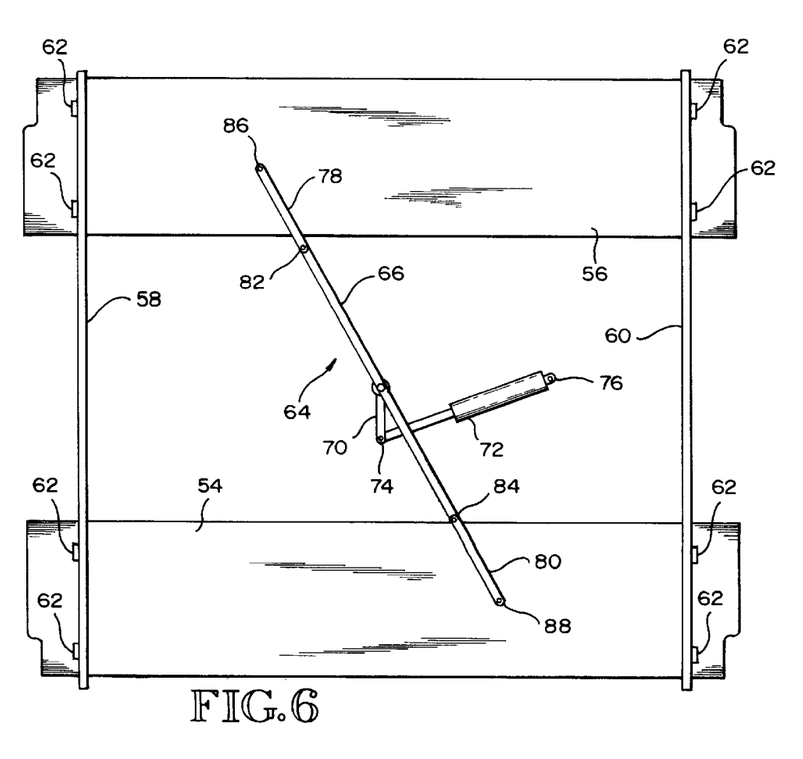
FIG. 6 is a view like FIG. 5 but showing the storage boxes moved apart from each other and further showing the mechanism for moving the boxes together and apart in its extended position.
Figure 7:
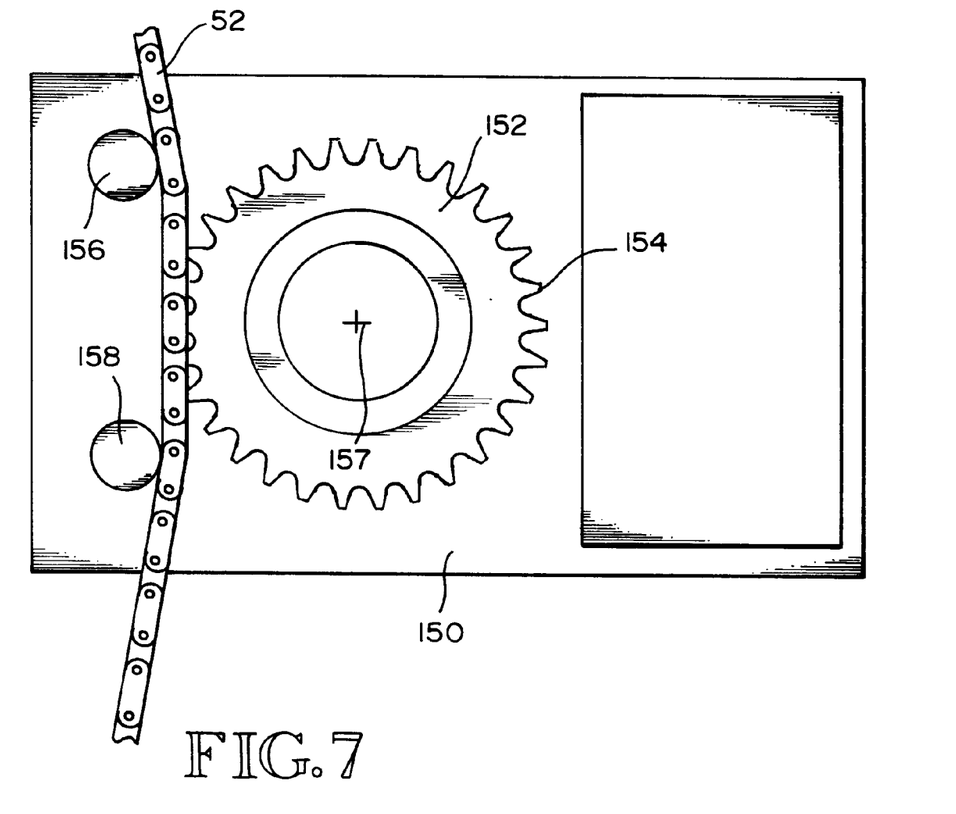
FIG. 7 is an enlarged scale top plan view of a drive motor and drive wheel or sprocket for a chain that in the preferred embodiment applies a rotational force to screw jacks that are at the four corners of the assembly, for causing them to move up and down together, such view including a broken or phantom line showing of a fragment of the chain where it engages the drive gear and two guide rollers.

As shown by FIGS. 1–3, 5 and 6, the frame 12 supports, in a hanging way, two storage boxes 54, 56, having the proportions best shown by FIGS. 5 and 6. Boxes 54, 56 are basically rectangular and are dimensioned to fit between the wheel wells W (FIG. 3) of the truck, in a truck that has wheel wells, when the frame 12 is in its lowered position and the storage boxes 54, 56 are moved relatively together, as shown by broken lines in FIG. 3. In this position, the storage boxes 54, 56 preferably substantially fill all of the vertical space between the lowered top 14 of frame 12 and the truck bed 32.

Figure 4:
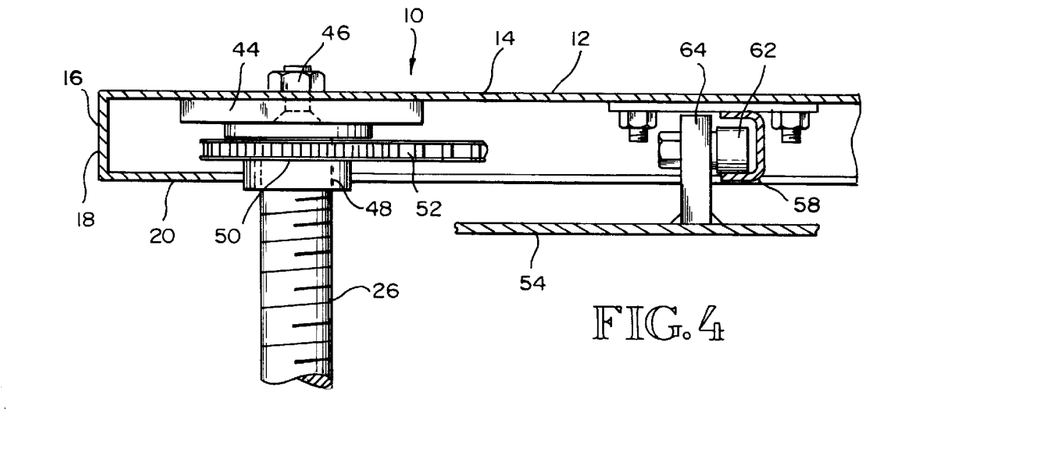
FIG. 4 is a fragmentary sectional view taken substantially along line 4—4 of FIG. 1, showing one of the transverse tracks from which the storage boxes are suspended and along which they are movable towards and away from each other.

In preferred form, and as shown by FIGS. 1 and 2, a pair of tracks 58, 60 extend transversely of the frame 14, and are connected to the top panel 14, such as shown in FIG. 4 with respect to track 58. Tracks 58, 60 may be channel members that are open along one side and have top flanges that are connected to the top panel 14. The lower flanges of the channels 58, 60 provide a surface on which rollers 62 are supported. The rollers 62 are secured to ribs 64 that are connected to and project upwardly from the tops of the storage boxes 54, 56. The roller 62 may turn on the dead axle that is secured to the rib 64 or may include a live axle which is supported for rotation by a mounting structure (not shown) that is connected to the ribs 64. Two or more rollers 62 are provided atop storage box 54, at each of its ends. An additional two or more rollers 62 are provided atop storage box 56 at each of its ends. Thus, each storage box 56, 54 has at least four widely spaced apart rollers 62 connected to it which mount it for travel along the tracks 58, 60. A considerably amount of storage box weight can be supported in this manner and still make is possible to move the storage boxes 54, 56 rather easily back and forth along tracks 58, 60. In some installations, the storage boxes 54, 56 can be moved inwardly and outwardly by hand. That is, they can be moved by either a push or a pull by a person standing on a side of the truck. Also, it is possible to substitute slide blocks for the rollers 62. The slide blocks may be made from a high quality, long lasting, low friction material that requires no lubrication, such as a structural plastic referred to as UHMW Plastic. The rollers 62 may also be made from this material or they may be a standard roller with an anti friction bearing supporting it for rotation.

Referring to FIGS. 5 and 6, a linkage 64 may be provided for moving the storage boxes 54, 56 together and apart. In the illustrated example, linkage 64 includes a center or main link 66 which is mounted to the frame 12 for pivotal movement about a vertical axis 68. A lever 70 is connected to a hub structure that is connected to link 66 and itself adopted to rotate about axis 68. The opposite or free end of lever 70 is connected to one end of a piston cylinder drive motor 62, by a pivot pin 64. The opposite end of the drive motor 72 is connected to the frame 14, also by a pivot pin connection. Extension of the linear motor 62 exerts a pushing force on the end of lever 70, swinging the lever 70 clockwise (as illustrated in FIGS. 5 and 6). A swinging movement of lever 70 causes a swinging movement of link 66, also in the clockwise direction. The opposite ends of link 66 are pivotally connected to first ends of box links 72, 74, at 76 and 78. The opposite ends of box links 72, 74 are pivotally connected to the boxes 54, 56 at 80, 82. FIG. 5 shows the positioning of the members 66, 70, 72, 78, 80 when the linear motor 72 is retracted. The main link 66 is rotated into a position that is close to being parallel to the storage boxes 54, 56. FIG. 6 shows that when the linear motor 72 is extended, it pushes on lever 70, rotating it and main link 66 in a clockwise direction. The ends of lever 66 impose forces on the levers 78, 80, moving them laterally outwardly from the pivot axis at 68. The lever 78, 80 in turn exert laterally outwardly directed forces on the storage boxes 54, 56, moving them from the positions shown by FIG. 5 into the positions shown by FIG. 6. With the particular linkage that is illustrated, rotation of link 66 and outward movement of storage boxes 54, 56 continues until the links 78, 80 are substantially aligned with link 66 as shown by FIG. 6. As will be appreciated, when the linkage is in the position as shown by FIG. 6, and then the linear motor 72 is retracted, the linkage will move back to the position by FIG. 5, pulling with them the storage boxes 54, 56. The linkage system that is shown requires only a small amount of vertical clearance between the tops of the storage boxes 54, 56 and the top panel 14 of the frame 12. This is shown in FIG. 3. Of course, there are a number of other ways of using power to move the storage boxes 54, 56. A screw drive or chain drive mechanism such as used to open and close overhead garage doors may also be used.

Figures 8, 9:
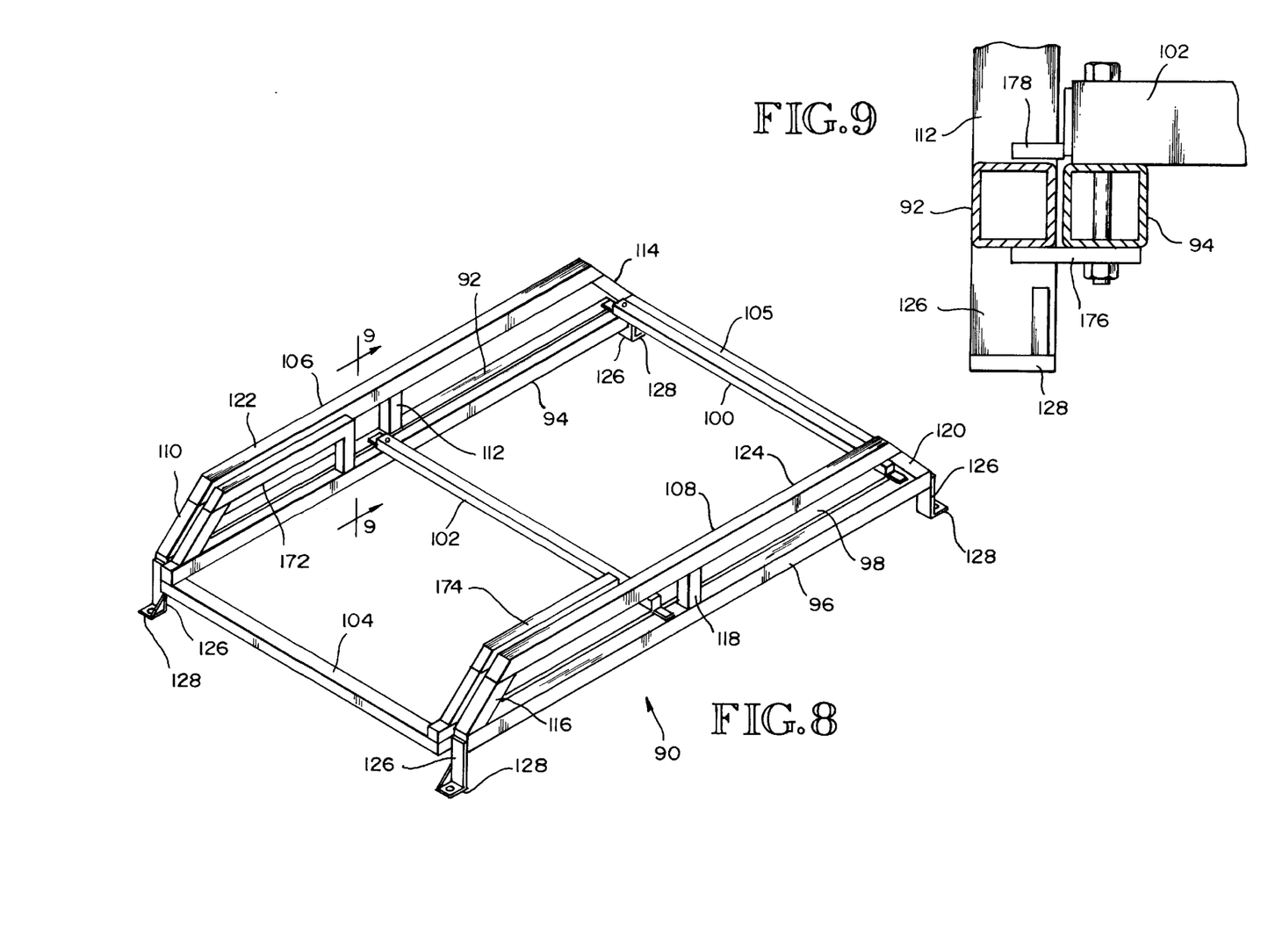
FIG. 8 is a pictorial view of a carrier that is adapted to be secured to the frame 12, such view being taken from above and looking towards one end of one side of the carrier.
FIG. 9 is a fragmentary sectional view taken substantially along line 9—9 of FIG. 8.
Figure 10:
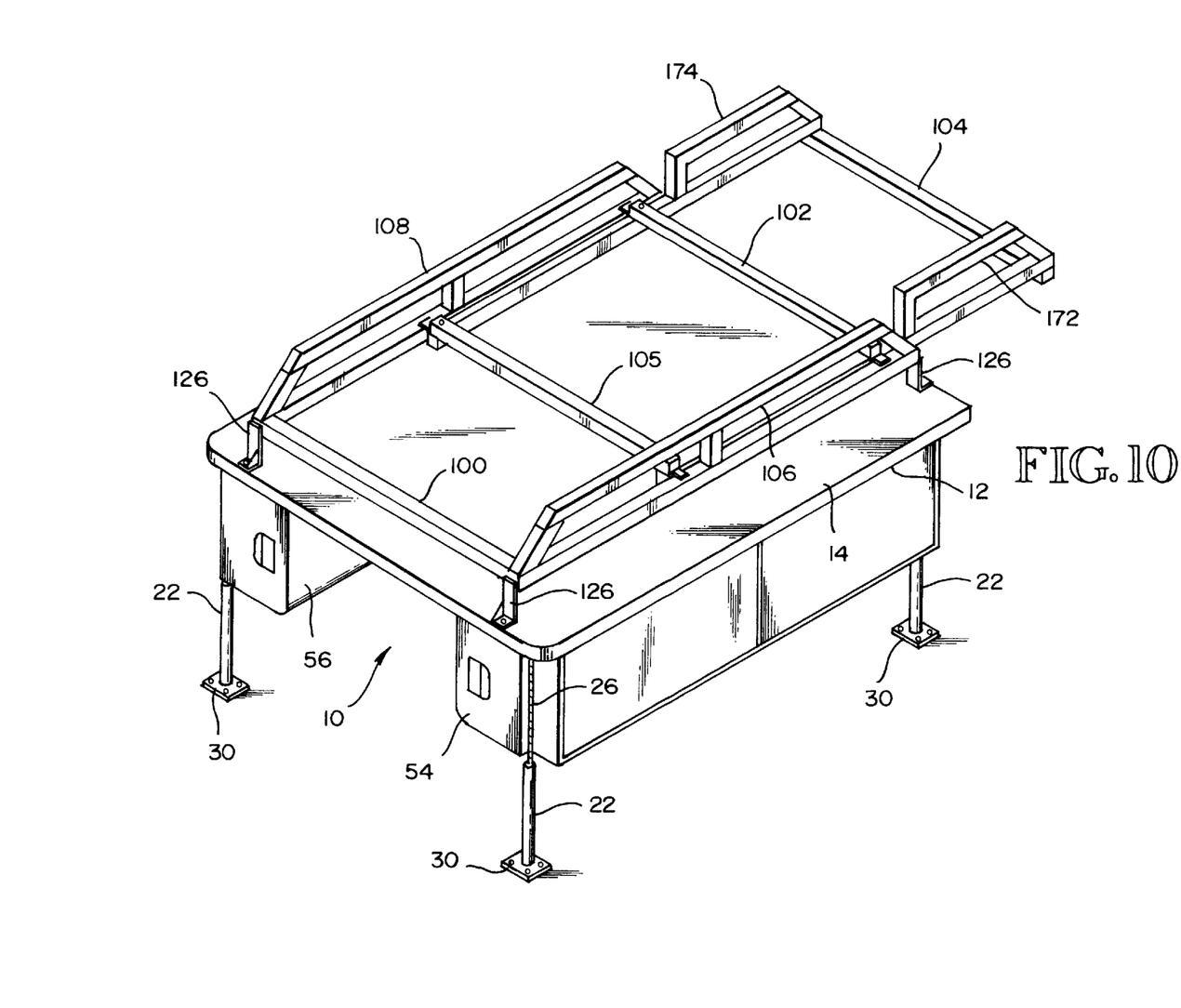
FIG. 10 is a view like FIG. 2, but showing the carrier rack secured to the top of the frame for the storage box assembly and showing its extended portion in an extended position.

FIG. 8 shows a rack or carrier 90 that is adapted to be secured to the top of the frame 12. It comprises longitudinal base frame members 92, 94, 96, 98, a transverse frame member 100 that is connected at its ends to members 92, 96, and transverse frame members 100, 12, 104 that are connected at their ends to members 94, 98. Carrier 90 may include upstanding side fences 106, 108 comprised of posts 110, 112, 114, 116, 118, 120 and top rails 122, 124. The bottoms of the posts 110, 114, 116, 120 may include mounting brackets 126. The mounting brackets 126 may have base walls 128 with openings for receiving bolts that are used to bolt the carrier 90 to the frame 12. FIG. 10 shows the carrier 90 of FIG. 8 mounted on top of the frame 12 and secured to the top panel 14. Lumber, ladders, tools, or other items can be placed on the cross frame members 100, 102, 104 between the fences 106, 108, and be latched to the carrier 90 by use of bungee cords, rope, straps, etc.

In the preferred embodiment, auxiliary fences 172, 174 are connected to end portions of the frame members 94, 98. As shown by FIG. 10, the frame members 94, 98, 102, 104, 105 and the auxiliary fences 172, 174 provide a portion of the carrier 90 that is extendable endwise outwardly from the main portion of the carrier 90. In its extended position, the carrier 90 is longer than the top panel 14 and the cargo compartment of the truck. It provides a longer carrying compacity for tools, ladders, lumber, etc. Bungee cords, rope, straps, etc. may be used for securing the load to the auxiliary fences 172, 174.

Guide members 176, 178 may be secured to the members 102, 105. As shown in FIG. 9, the guide members 176, 178 extend laterally outwardly into positions below and above the frame members 92, 96. Guide members 176, 178 serve to guide the extendable portion of the carrier 90 as it moves between its retracted position (FIG. 8) and its extended position (FIG. 10). Frame members 92, 96 restrain the extendable portion of the carrier 90 against sideways movement. The guides 176, 178 restrain it against vertical movement relative to the frame members 92, 96. The only movement provided for is and endwise movement. Any other suitable lock mechanism may be used for holding the extendable portion of the carrier 90 in its retracted and extended positions. For example, bolts (not shown) may extend through aligned openings in the frame members 92, 94 and/or in the frame members 96, 98.

The storage boxes 54, 56 each includes a bottom 130, 132, inside sidewall 134, 136, an outer side 138, 140 and end walls. The rearward end walls shown in FIG. 3 are designated 142, 144. In the illustrated embodiment, the end walls 142, 144 include doors that when opened provide access compartments within the storage boxes 54, 56. The outer sides 138 may also include doors or at least access openings into the storage boxes 54, 56. The storage space within the storage boxes 54, 56 can be utilized in many number of ways. For example, one or both of the storage boxes 54, 56 may include a single large compartment that is accessible by either an outside opening or a rear end opening or both. Either one or both of the storage boxes 54, 56 may be divided into several spaces. A common door or closure can be provided for several spaces. Or, each space may have its own door or closure.

Referring to FIG. 3, when the storage boxes 54, 56 are both raised and moved apart, the outer portions of the storage boxes 54, 56 are positioned above the sidewalls 36, 38 of the truck. When in this position, the storage space in the storage boxes 54, 56 may be accessed from the sides of the vehicle, provided the outer sides 138, 140 of the storage box 54, 56 includes an access openings. In some installations, it may be desired to provide the outer sides of the storage boxes 54, 56 with solid walls, and provide access to the inside of the storage boxes 54, 56 only through rear access openings. Or, portions of the storage boxes 54, 56 that are laterally inwardly of the threaded rods 26 may be accessed from rear access openings and outer side portions may be accessed through side access openings.

FIGS. 1 and 2 show a drive motor 150 for the drive chain 52, positioned at the front end of the frame 12, substantially at the lateral center of the frame 12. The drive motor is connected to and drives a toothed wheel or sprocket 152. The teeth 154 mesh with the drive chain 52. Guide members or rollers 156, 158 are positioned on the side of the chain 52 opposite the wheel 152. The members 156, 158 press against the chain 52 and hold it into engagement with the teeth 154. The drive motor 150 is reversible and serves to drive the toothed wheel 152 either clockwise or counterclockwise about axis 156. Rotation of the toothed wheel 152 in one direction moves the chain 52 to cause rotation of the toothed wheels 50 in a direction that causes the threaded rods 126 to screw themselves down into the housings 24. Rotation of the toothed wheel 152 in the opposite direction, and hence movement of the chain 52 in the opposite direction, rotates the toothed wheels 50 in the opposite direction, causing the threaded rods 26 to screw themselves up out of the housings 24. The connection together of the toothed wheels 50 in this manner causes all four of the toothed wheels 50 to rotate at the same time, at the same speed, and by the same amount. This causes all four threaded rods 26 to screw themselves into and out from the housings 24 at the same rate. As a consequence, all four corners of the frame and storage box assembly move up and down together.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. For use with a truck cargo compartment having sidewalls and a bottom, a storage box assembly comprising:

a frame;

columns at the corners of the frame, fittable within the truck cargo compartment, said columns being vertically adjustable for raising and lowering the frame between a lowered position and a raised position;

a pair of storage boxes, said storage boxes including storage space;

said storage boxes being above the sides of the storage compartment when the frame is raised;

said storage boxes being movable laterally inwardly on the frame, when the frame is in its raised position, into positions inside of the sides of the cargo compartment, enabling the frame to be lowered to its lowered position, to move the storage boxes downwardly into the cargo compartment; and said storage boxes being movable laterally outwardly on the frame, when the frame is in its raised position, into positions in which the storage spaces are accessible from outside the cargo compartment.

2. A storage box assembly according to claim 1, wherein the frame includes a top panel that is dimensioned to substantially cover the cargo compartment when the frame is in its lowered position.

3. A storage box assembly according to claim 2, wherein the top panel of the frame extends laterally over the sidewalls of the truck cargo compartment when the frame is in its lowered position.

4. A storage box assembly according to claim 3, wherein the vertically adjustable columns at the corners of the frame are screw jacks.

5. A storage box assembly according to claim 4, further comprising drive means for driving all four screw jacks together, for causing the four corners of the frame to go up and down together.

6. A storage box assembly according to claim 1, wherein the frame includes a top panel with a four sided periphery, a vertical wall extending downwardly from the top panel at its periphery, and a horizontal flange projecting laterally inwardly from the vertical wall, whereby the peripheral portion of the top panel, the vertical wall and the flange together provide stiffness and strength to the peripheral portion of the frame.

7. A storage box assembly according to claim 6, wherein the vertically adjustable columns at the corners of the frame are screw jacks.

8. A storage box assembly according to claim 7, further comprising reversible drive means for driving all four screw jacks together for causing the four corners of the frame to go up and down together.

9. A storage box assembly according to claim 1, wherein the vertically adjustable columns at the corners of the frame are screw jacks.

10. A storage box assembly according to claim 9, wherein the screw jacks each have a housing with a base that is adapted for mounting the housing to the truck cargo compartment, and an end portion opposite the base that is internally threaded, and an externally threaded rod that extends upwardly outwardly from the housing, with its external threads mating with the internal threads in the end portion of the housing, said externally threaded rods being adapted to rotate both clockwise and counterclockwise, with rotation in one direction causing the externally threaded rod to move axially out from the housing and with rotation in the opposite direction causing the externally threaded rod to move axially into the housing.

11. A storage box assembly according to claim 10, wherein the internally threaded rods are at their upper ends pivotally mounted to the corners of the frame.

12. A storage box assembly according to claim 1, further surprising supporting and guiding track structure connected to the frame, between the frame and the storage boxes, and bearings on the storage boxes which engage the tracks, said tracks and bearings together mounting the storage boxes for lateral movement towards and away from each other.

13. A storage box assembly according to claim 12, further comprising a power drive anchored on the frame and connected to the storage boxes, for applying a force to the storage boxes, for selectively moving them together and apart.

14. A storage box assembly according to claim 13, wherein the vertically adjustable columns at the corners of the frame are screw jacks.

15. A storage box assembly according to claim 14, wherein the screw jacks each have a housing with a base that is adapted for mounting the housing to the truck cargo compartment, and an end portion opposite base that is internally threaded, and an externally threaded rod that extends upwardly outwardly from the housing, with its external threads mating with the internal threads in the end portion of the housing, said externally threaded rods being adapted to rotate both clockwise and counterclockwise, with rotation in one direction causing the externally threaded rod to move axially out from the housing and with rotation in the opposite direction causing the externally threaded rod to move axially into the housing.

16. A storage box assembly according to claim 15, further comprising drive means for driving all four screw jacks together, for causing the four corners of the frame to go up and down together.

17. A storage box assembly according to claim 1, wherein the vertically adjustable columns at the corners of the frame are screw jacks, each having a lower housing portion and an upper rod portion, said housing portion having an upper end portion that is internally threaded, and the rod portion being externally threaded, said rod portion extending upwardly outwardly from the housing, with its external threads mating with the internal threads in the upper end portion of the housing, said externally threaded rods being adapted to rotate both clockwise and counterclockwise, with rotation in one direction causing the externally threaded rod to move axially out from the housing and with rotation in the opposite direction causing the externally threaded rod to move axially into the housing.

18. A storage box assembly according to claim 10, wherein each externally threaded rod has an upper end portion that is pivotally mounted to the frame, and a toothed wheel at its upper end, below the pivotal mount, and a chain extending around all of the toothed wheels, and engaging the toothed wheels, said chain being movable back and forth along its length for imparting a force to the toothed wheels, for rotating them and the threaded rod portions of the screw jacks.

19. A storage box assembly according to claim 18, comprising a power drive for the chain that includes a toothed wheel that engages the chain and a motor for selectively driving the toothed wheel in each direction of rotation, for imparting a drive force to the chain.

20. A storage box assembly according to claim 1, further comprising a carrier rack secured to the frame, said carrier rack being above the frame and above the storage boxes.

21. A storage box assembly according to claim 20, wherein the carrier rack has a main portion that is secured to the frame and an extendable-retractable portion that is mounted on the main portion and is movable endwise between retracted and extended positions, and when in its extended position increases the length of the carrier rack.

* * * * *